United States Patent
Roeder et al.

[11] Patent Number: 6,057,964
[45] Date of Patent: May 2, 2000

[54] PROCESS FOR IMAGING IMAGE POINTS OF A VIDEO PICTURE AND ASSOCIATED APPARATUS

[75] Inventors: Rolf Roeder, Jena-Lobeda; Christhard Deter, Gera, both of Germany

[73] Assignees: Carl Zeiss Jena GmbH, Jena; LDT GmbH Laser-Display-Technologie KG, Gera, both of Germany

[21] Appl. No.: 08/793,219
[22] PCT Filed: Apr. 26, 1996
[86] PCT No.: PCT/EP96/01751
§ 371 Date: Feb. 19, 1997
§ 102(e) Date: Feb. 19, 1997
[87] PCT Pub. No.: WO97/01248
PCT Pub. Date: Jan. 9, 1997

[30] Foreign Application Priority Data

Jun. 22, 1995 [DE] Germany ............... 195 22 698

[51] Int. Cl.[7] .................................................. G02B 27/10
[52] U.S. Cl. ................ 359/618; 359/202; 359/206; 359/216; 359/677; 250/201.4
[58] Field of Search ................................. 359/618, 202, 359/201, 206, 216, 217, 218, 694, 699, 700, 676, 677; 250/201.4, 226

[56] References Cited

U.S. PATENT DOCUMENTS 4,624,536 11/1986 Nakagawa .................. 359/677
4,736,110 4/1988 Awamura .................... 359/206
5,694,180 12/1997 Deter et al. ................. 359/618

FOREIGN PATENT DOCUMENTS 2699690 6/1994 France .
43 24 849 2/1995 Germany .

OTHER PUBLICATIONS

Patent Abstracts of Japan, vol.10, No.338 (P–516) Nov. 15, 1986 JP–A–61 141434.

*Primary Examiner*—Loha Ben
*Attorney, Agent, or Firm*—McAulay Nissen Goldberg Kiel & Hand, LLP

[57] ABSTRACT

In a process for imaging image points of a video picture by means of a light bundle which is controlled in intensity with respect to the brightness of the image points and which is deflected and then projected onto a screen by a lens or a lens system, a variable focal length is provided for the lens, the lens system or a partial lens system of the lens system and an object-side focal point is maintained stationary when the focal length is varied. In an apparatus for imaging image points of a video picture on a screen, with a deflecting device which deflects a light bundle onto a screen for linewise and framewise raster-scanning, this light bundle being controlled in intensity with respect to the brightness of the image points, and with a lens or a lens system between the deflecting device and the screen, the lens, the lens system or a partial lens system of the lens system can be adjusted with respect to focal length, and a device is provided which maintains stationary an object-side focal point of the lens or partial lens system during adjustment of the focal length.

20 Claims, 3 Drawing Sheets

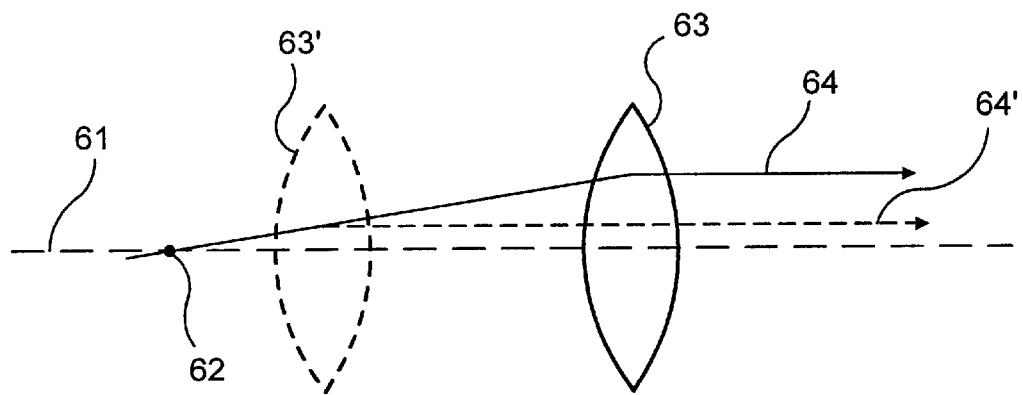
F I G. 2
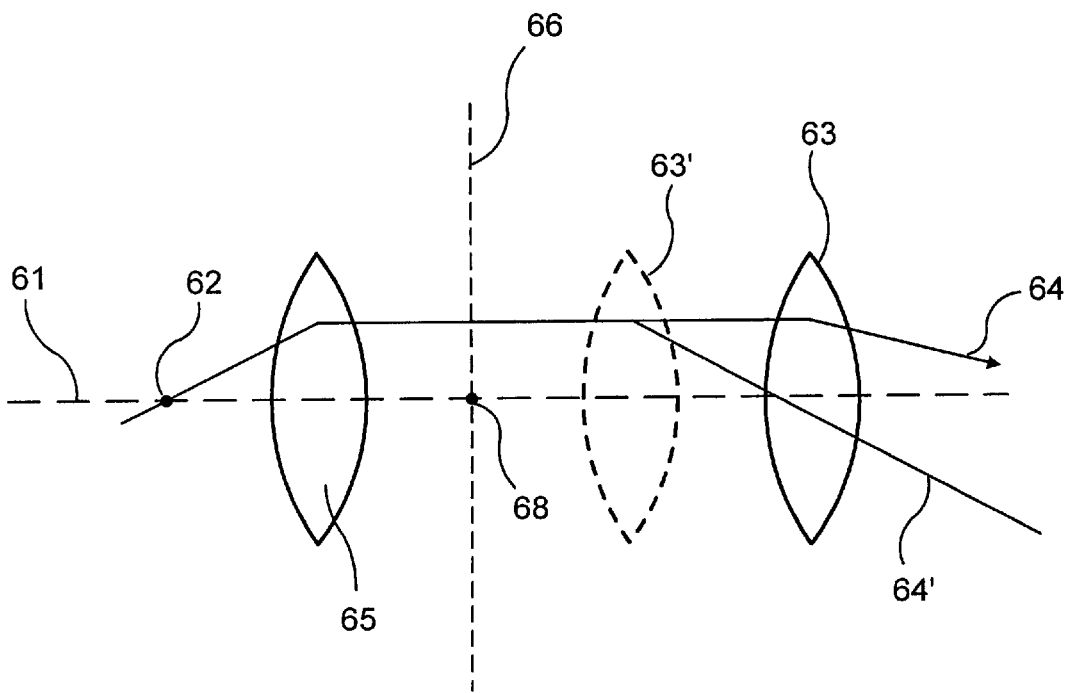
F I G. 3

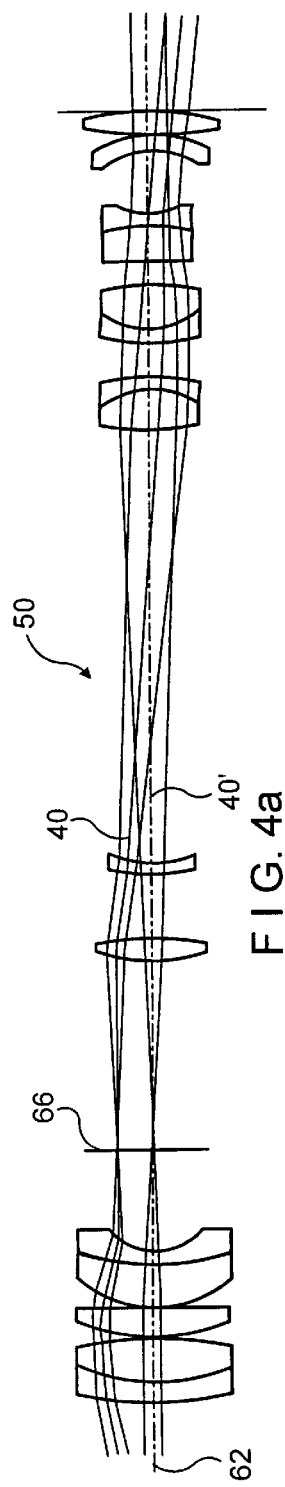
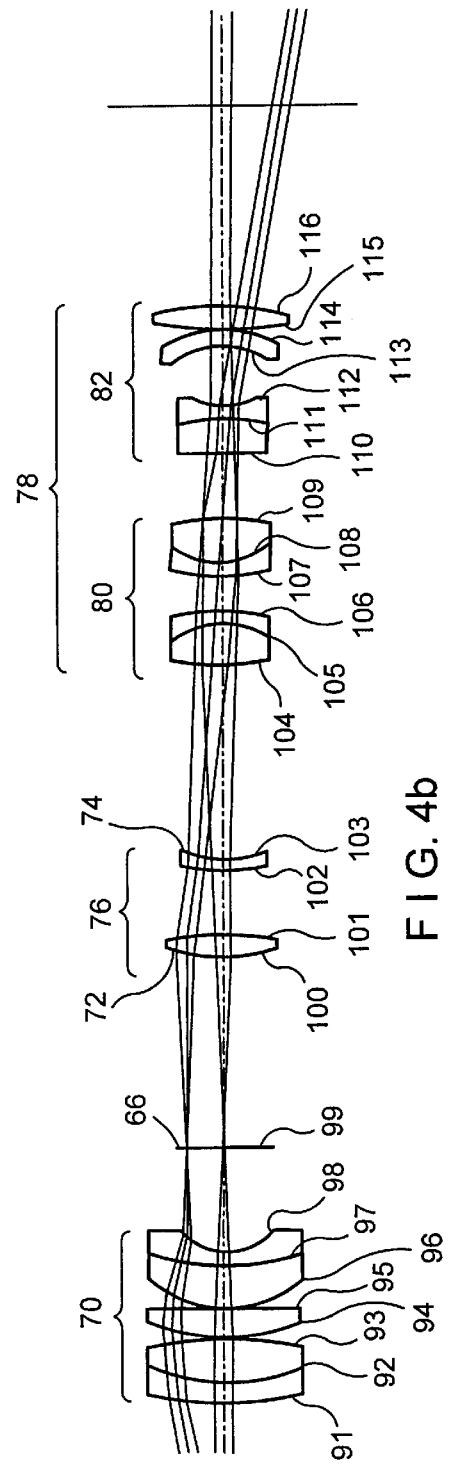
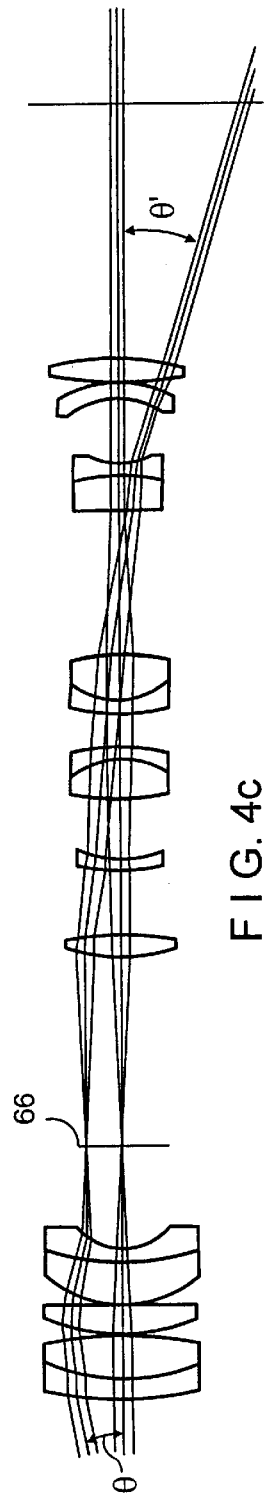
FIG. 4a
FIG. 4b
FIG. 4c

PROCESS FOR IMAGING IMAGE POINTS OF A VIDEO PICTURE AND ASSOCIATED APPARATUS

BACKGROUND OF THE INVENTION (a) Field of the Invention

The invention is directed to a process for imaging image points of a video picture by means of a light bundle which is controlled in intensity with respect to the brightness of the image points and which is deflected and then projected on a screen by a lens or a lens system. Further, the invention is directed to an apparatus, in particular for carrying out the process and especially for the imaging of image points of a video picture on a screen, with a deflecting device which deflects a light bundle onto a screen for linewise and framewise raster-scanning, this light bundle being controlled in intensity with respect to the brightness of the image points, and with a lens or a lens system between the deflecting device and the screen.

(b) Description of the Related Art

In conventional video technique using picture tubes, the image size is very limited due to high cost. However, other techniques known from the literature can be used to generate very large color video pictures. For example, devices are described in an article in Funkschau 1970, 4, pages 69ff. and in EP-OS 0 084 434 in which three light bundles of different colors generated by lasers are intensity-modulated by light modulators and combined via a mirror system to form a common light bundle which is mechanically raster scanned by means of a mirror system and is projected onto a screen.

In professional applications, large-image projectors are also currently being used. However, they are based on a different imaging principle. Regardless of the technical principle, however, large-image projectors are subject to the same requirements regarding image size. Due to their high price, these projectors are seldom permanently installed, but rather are rented from rental firms for special cases. Therefore, such large-image projectors must be kept flexible for many kinds of applications. In practice, such devices can be used in small cinemas as well as in football stadiums. For this reason, there is a considerable need for variable image size.

There has been no satisfactory solution to date for imaging a video picture with laser light bundles as described above. A magnification or reduction of the image size can be achieved, for instance, by mechanically modifying or exchanging the deflecting device, but this is complicated and expensive. Above all, this possibility is not practicable for large projection devices which are hired out to various facilities, since operators usually having scant technical ability cannot be expected to constantly readjust the mirrors for the purpose of the respective case of application at the place of use.

For the magnification of the video picture in video devices operating with laser technology, DE-OS 43 24 849 suggests the use of a substantially afocal lens system by which the image field can be expanded. This lens system enables a flatter type of construction of such video systems, for example. However, magnification is fixed in the lens system described in this reference, since it is designed primarily to achieve magnification with minimum chromatic errors and distortion. Since the lens system is optimized for reducing imaging errors, it can hardly be assumed that this optimum can be maintained, e.g., by varying the imaging characteristics of a partial system. Therefore, another solution must be sought.

In order to change the angle of an exiting light beam relative to the incident light beam, $f(\theta)$ lenses in which the angle is adjusted according to a predetermined function f are also known. For instance, lenses which use a tangent function for angular adjustment in order to transform a uniform angular deflection for uniform raster scanning in a plane are used in technical applications.

However, such optical systems do not enable magnification. Above all, an analysis contained in DE-OS 43 24 849 indicates that such $f(\theta)$ lenses cannot be constructed so as to be free of distortion and free of chromatic errors at the same time within acceptable tolerances, which indicates that there is no suggestion to change the image size in a variable manner in video technology in connection with $f(\theta)$ lenses.

Variable-focus objectives for use in cameras or film projectors are known from the prior art. However, they are only suitable for imaging a flat picture on a screen, as in the magnification of a slide on a projection screen. However, in video systems or laser printers, an angle which is generated by the deflection of the mirrors of the deflecting device must be converted into a deflection on a plane screen. Thus, the image would first have to be transformed into an image with a $f(\theta)$ lens before projecting it by means of a known variable-focus objective. As is stated in DE-OS 43 24 849, this cannot be carried out without distortion and without chromatic errors at the same time.

In summary, it must therefore be asserted that there has been no satisfactory solution to date for a variable changing of the image size in laser video systems. However, variable adjustment of image size is necessary particularly for the flexible use of video devices in professional applications for different spatial conditions.

OBJECT AND SUMMARY OF THE INVENTION

The primary object of the present invention is to provide a process and an apparatus for imaging video pictures by means of a deflected light bundle which enable the image size to be changed in a simple and manageable manner.

Based on the process mentioned above, this object is met in that a variable focal length is provided for the lens, the lens system or a partial lens system of the lens system and an object-side focal point is maintained stationary when the focal length is varied.

The process according to the invention accordingly makes use of lens systems or lenses with variable focal length, such as variable-focus systems or zoom lenses, which are known from the technical field. However, these lens systems or lenses are operated in a novel manner in that the position of the focal point is set in a defined manner also when the focal length is changed. In this way, angular changes generated by the deflecting device for imaging on a screen are increased or reduced in a suitable manner.

The way in which the process works will become clearer from the following approximation. In view of the large distances involved in the video projection described above, the lens system can be regarded, in a first approximation, as a thin lens in accordance with the lens equation. Thus, the known lens formula $$1/f = 1/g + 1/b,$$

where f is the focal length, g is the object distance, and b is the image distance, can be used by way of approximation. When the image distance b is very great, the term 1/b can be ignored in a first approximation, so that g approximates f Accordingly, when f changes, g also changes. The image size then depends on f based on the second ray principle, although the imaging characteristics with respect to sharpness and distortions remain the same. Further, the relationship whereby g approximates f states that the focal point is also always located at the same point as f changes.

Although the imaging principle can be understood from the approximation, it must be kept in mind that this is only a very rough approximation. Therefore, a priori, the image quality cannot be expected to remain the same. However, model calculations have shown that optical systems for changing the image size which provide excellent image quality can also be constructed in a simple manner based on this principle. This will be discussed in more detail in the following with reference to further developments of the invention.

It is also clear from the approximation mentioned above that the smaller the space requirement for the lens or lens system for changing the image size, the better this approximation conforms to practical conditions, since the approximation depends upon whether or not the dimensions of the lens system can be ignored. A lens system constructed on the basis of the invention is therefore advantageously extremely compact, which is a substantial advantage in the case of large projection devices which are hired out, particularly with respect to packing, since these large projection devices must frequently be installed in different locations.

As is also clear from the approximation, the image shown on a screen has a higher quality if the image information is particularly well defined at the set focal point. Therefore, in a preferable further development of the invention, the object-side focal point which is kept stationary is maintained within a spatially extended area in which the deflection is effected or, in the case of a partial lens system, in a plane in the optical path of the lens system in which the light bundle is focussed.

In this further development, however, the position of the focal point in not required to be in the point of deflection, since there is no such point in the case of independent raster scanning in two directions, as in video pictures. Rather the deflection is carried out within a spatially extended area given by the framewise and linewise raster scanning.

The image contents are determined particularly well locally in this spatially well-defined area because of the defined angle during deflection, so that this area is especially well-suited for establishing the object-side focal point of the lens, partial lens system or lens system with variable focal length. In an alternative according to a preferred further development of the invention in which the light bundles are well focussed in a plane, a good image quality is given on the basis of the indicated definition of the plane via the focussing of the light bundle. This image is then reproduced in other dimensions on the screen. A very good image quality is achieved in both cases.

The significance of these features will be readily appreciated by a thorough consideration of the simplest possible optical system enabled by the process features.

The simplest possible optical system consists in the arrangement of a variable-focus objective with the object-side focal point situated at the point where deflection occurs. Every light beam proceeding from this point is changed into a light beam proceeding from the variable-focus objective parallel to the optical axis of the variable-focus objective, wherein the distance from the optical axis is determined by the angle. For geometrical reasons, this distance also depends on the focal length. This means that with a fixed focal length the information contained in the rastered light bundle is reproduced as an image having constant dimensions regardless of the distance from the screen. When the focal length changes but the focal point stays in the defined position of the deflecting device, the geometrical optical relationships lead to a change in the image size.

The image occurring in this way can then be further enlarged with additional objectives or lens systems known from the prior art with fixed magnification.

However, there are also other possibilities for adjusting the magnification with the use of a more complex lens system. For example, a fixed image can be generated by an individual lens or a lens system from light bundles passing parallel to the optical axis and is then enlarged by conventional means such as is carried out with variable-focus objectives used in slide projectors. However, the requirement that the focal point of the subsequent optical system should lie in this intermediate image plane leads away from classical variable-focus objectives to a different construction, as a result of which, as experience has shown, the entire optical system can be corrected so as to be free of distortion and minor chromatic errors to a great extent.

Thus, the invention not only enables magnification which can be adjusted within wide limits, e.g., for adapting a video device to different spatial conditions, but also, at the same time, allows the showing of images with a high reproduction quality.

A special lens system with variable focal length designed in such a way that the object-side focal point remains stationary when the focal length changes could be used to carry out the process. However, this side constraint renders the construction of a corresponding video system more difficult.

On the other hand, according to a preferred further development of the invention, the object-side focal point is maintained stationary in that the position of the lens, lens system or partial lens system is changed when the focal length changes. In so doing, the lens system with variable focal length is less limited in terms of design and is therefore easier to optimize in a position-independent manner. The readjustment of the position also does not require a substantially increased expenditure. Accordingly, the image quality can be increased in a simple manner.

The invention is further directed to an apparatus for carrying out the process described above and is characterized, based on the apparatus described above, in that the lens, the lens system or a partial lens system of the lens system can be adjusted with respect to focal length, and a device is provided which maintains stationary an object-side focal point of the lens or partial lens system during adjustment of the focal length.

The optical system associated with the lens and the lens system has already been described above in relation to the process. In the apparatus, however, a special device for keeping the focal point at a defined location is provided in addition. As a result of this device, the process steps need not be divided into a first step in which the focal length is adjusted and a second step in which the focal point is subsequently moved to a defined point. Accordingly, the apparatus can be adapted to the desired conditions in a particularly simple manner. For professional use of video equipment, the video system can be adapted to spatial conditions in principle by a single hand movement for adjusting the focal length, since the defined fixing of the focal point is effected practically automatically as a result of the device when appropriately designed.

In a preferred further development of the apparatus according to the invention, the device fixes the object-side focal point within an area of the deflecting device or in a plane in the optical path of the lens system in which the light bundle can be focussed.

The advantages of this further development of the apparatus according to the invention have already been described in detail with reference to a further development of the process.

A turret with different lenses or lens systems could be provided for carrying out the process or for the apparatus. It can also be taken into account at the same time when arranging lenses in a turret that the position of the focal point defined in the process and in the apparatus is maintained. In this case, the device used in the apparatus is also constructed by means of the turret.

However, this solution only allows a limited number of magnifications so that, while it is still possible to adapt to determined spatial conditions, the video picture does not always completely fill the screen. Although the lens systems in the turret can be graduated as finely as desired, limits are reached very quickly in terms of cost, since the construction of the individual lens systems should be of a high quality for high imaging quality.

In order to reduce costs while retaining high imaging quality, a preferred further development of the invention provides that the lens, lens system or partial lens system of the lens system has a continuously adjustable focal length. Accordingly, the image size can always be adjusted in a suitable manner. In addition, this construction is also more economical since, as is the case in the variable-focus objectives of the prior art, the same lenses are used for every magnification. Adjustment of the focal length in lens systems, for instance, is effected in that the partial lens systems of these lens systems are displaced relative to one another as in conventional variable-focus objectives.

According to another preferred further development of the invention, the lens system is a substantially afocal lens system. Afocal lens systems allow imaging in which a light bundle entering at a determined angle at the input side is changed into another light bundle exiting at a different angle and in which the tangent functions of the two angles are in a fixed ratio given by the focal lengths of individual stages. Accordingly, it is possible to design the total system so as to be free of distortion and with minimum chromatic errors.

For this reason, a substantially afocal system is extremely advantageous for high image quality. An afocal lens system can be realized, for example, by two partial systems, wherein the image-side focal point of the first partial system lies in the object-side focal point of the second partial system. A light beam which is imaged through the object-side focal point of the first partial system is then transformed in accordance with the ratio of tangent functions mentioned above.

As was already mentioned above, there is no single point for the deflection of the light bundle in the case of two-dimensional deflection in the video systems mentioned in the beginning. Rather, a spatially extended area defined by the two orthogonal deflections must be taken as a basis for the deflection. This deviation from the ideal conditions must be taken into account when adjusting the optical system so that, in contrast to conventional afocal lens systems, the image-side focal point of the first partial system does not lie exactly at the same location as the object-side focal point of the second partial system. The lens system is accordingly not an afocal lens system by definition, but rather only makes use of the imaging principles. This is why such an imaging system is referred to herein as a "substantially" afocal lens system.

In a preferable further development of the invention, the lens system comprises multiple stages and the first stage is arranged at a constant distance to the deflecting device, wherein at least one of the other stages has a variable focal length and is arranged so as to be displaceable relative to the first stage.

According to a further development of the invention, the first stage is arranged at a constant distance from the deflecting device, that is, it remains stationary. The lens or corresponding partial lens system with variable focal length required for the invention is realized in another, subsequent stage of the lens system. Accordingly, a large area is available for the magnification or reduction of the image, since a possible spatial limitation due to the position of the deflecting device need not be taken into account. For reasons relating to geometrical optics, a video system already has a larger space available in the direction of the image surface than in the direction of the deflecting device.

In an additional further development of the invention, the lens system is so designed that the video picture can be imaged in an intermediate image plane upstream of the lens or partial lens system with variable focal length and the lens or partial lens system with variable focal length is displaceable by means of the device in such a way that its object-side focal point substantially lies on an optical axis of the lens system in the vicinity of or within the intermediate image plane.

Based on these features, the different angles occurring during raster scanning by the first lens define positions of image points in an intermediate image plane. Accordingly, it is possible to use variable-focus objectives known from the prior art such as those used, e.g., for projecting a slide on a screen. Known constructions can then be taken over for development, which particularly lowers the price. This is especially advantageous in professional applications because development costs make up a significant part of the final price due to the small production quantities.

Further, as optical model calculations have shown, it is possible to keep such a lens system not only practically free of distortion, but also free of chromatic errors when the object-side focal point lies in the vicinity of or within the intermediate image plane. Thus, the further development above all increases the quality of color video pictures.

According to a preferable further development of the invention, a field lens or field lens group is arranged between the intermediate image plane and the partial lens system with variable focal length.

As a result of the field lens, as will become clearer hereinafter with reference to an embodiment example, the opening angle of the light coming from the intermediate image plane can be reduced relative to the optical axis and the exit pupil can be shifted to the partial lens system arranged downstream.

In general, the partial lens system with variable focal length or the variable-focus objective which are arranged downstream of the field lens cannot be designed as compactly as desired in the direction of the optical axis, so that the possible magnification factor or reduction factor would be limited without the field lens. On the other hand, the field lens or field lens group makes it possible to adapt the area for the deflection of the light bundle onto the screen in a simple manner for practical requirements.

The shifting of the pupil into the partial lens system arranged downstream makes it possible to correct for distortion in a simple and economical manner.

In another preferred further development of the invention, the last stage of the multiple-stage afocal lens system is constructed as a lens or as a partial lens system with variable focal length.

As was already mentioned above, the attainable magnification or reduction of a video picture depends, among other things, on how much space is available for changing the variable focal length. Although sufficient space is obtained by outfitting the second stage or a later stage of the lens system with a variable focal length as was described above, the number of mechanical movements of partial stages must be increased. This will be immediately appreciated when considering, e.g., the second stage in a system comprising at least three stages: when adjusting the focal length of the second stage according to the invention, the third stage must be displaced along with it.

This necessity is eliminated according to the further development, since only the last stage is designed for changing the focal length. Accordingly, mechanical adjusting devices are advantageously dispensed with. In general, these mechanical adjusting devices contain specially cut threads. Consequently, the further development also reduces the cost of the lens system without the need to make do with limitations for the available change in dimensions of the region of the light bundle scanned on the screen.

In a preferred further development of the invention, the partial lens system or the lens system with variable focal-length has two system stages which are displaceable relative to one another and by means of which the focal length can be adjusted, and a movement mechanism is provided which is so designed that the object-side focal point remains stationary as the focal length changes.

This lens system is characterized by great simplicity compared with other lens systems in that it has only two system stages which are adjustable relative to one another. The movement mechanism is constructed in a very simple manner because the object-side focal point of the lens system remains stationary. This also results in a simplification of the lens system in an apparatus according to the invention.

The further development of the invention also renders the apparatus user-friendly. Because of the specially designed movement mechanism, only one adjustment is needed, namely the adjustment for the focal length. The position of the lens system with variable focal length need not be additionally readjusted.

In another preferred construction of the invention, the movement of one system stage relative to the other system stage is effected by means of a mechanical cam control. Accordingly, the focal length can be adjusted in a particularly simple manner while the object-side focal point remains stationary. In principle, the individual system stages could also be adjusted by an electric drive and position regulating means specially adapted to the conditions mentioned above. However, the mechanical cam control is substantially more economical, especially in view of the small production quantities expected in the field of professional video equipment. The cam control can be carried out in a particularly advantageous manner with a specially cut thread.

In another preferable construction, the lens system is corrected for chromatic errors and distortion.

Since no f(θ) lens is required in the lens system according to the invention, such a correction can be carried out based empirically. The image quality is distinctly improved by optimizing partial lens systems while minimizing chromatic errors of the entire lens system.

The invention will be explained more fully in the following by way of example with reference to the drawings.

BRIEF DESCRIPTION OF THE DRAWINGS

In the drawings:

FIG. 2 shows a schematic view of a lens system for changing the image size according to a first embodiment example of the invention;

FIG. 3 shows a schematic view of a lens system for changing the image size according to another embodiment example of the invention and;

FIG. 4 shows a preferred embodiment example of the lens system according to the principle shown in FIG. 3 in various positions a, b, c to illustrate the focal length adjustment.

DESCRIPTION OF THE PREFERRED EMBODIMENTS

Figure 1:
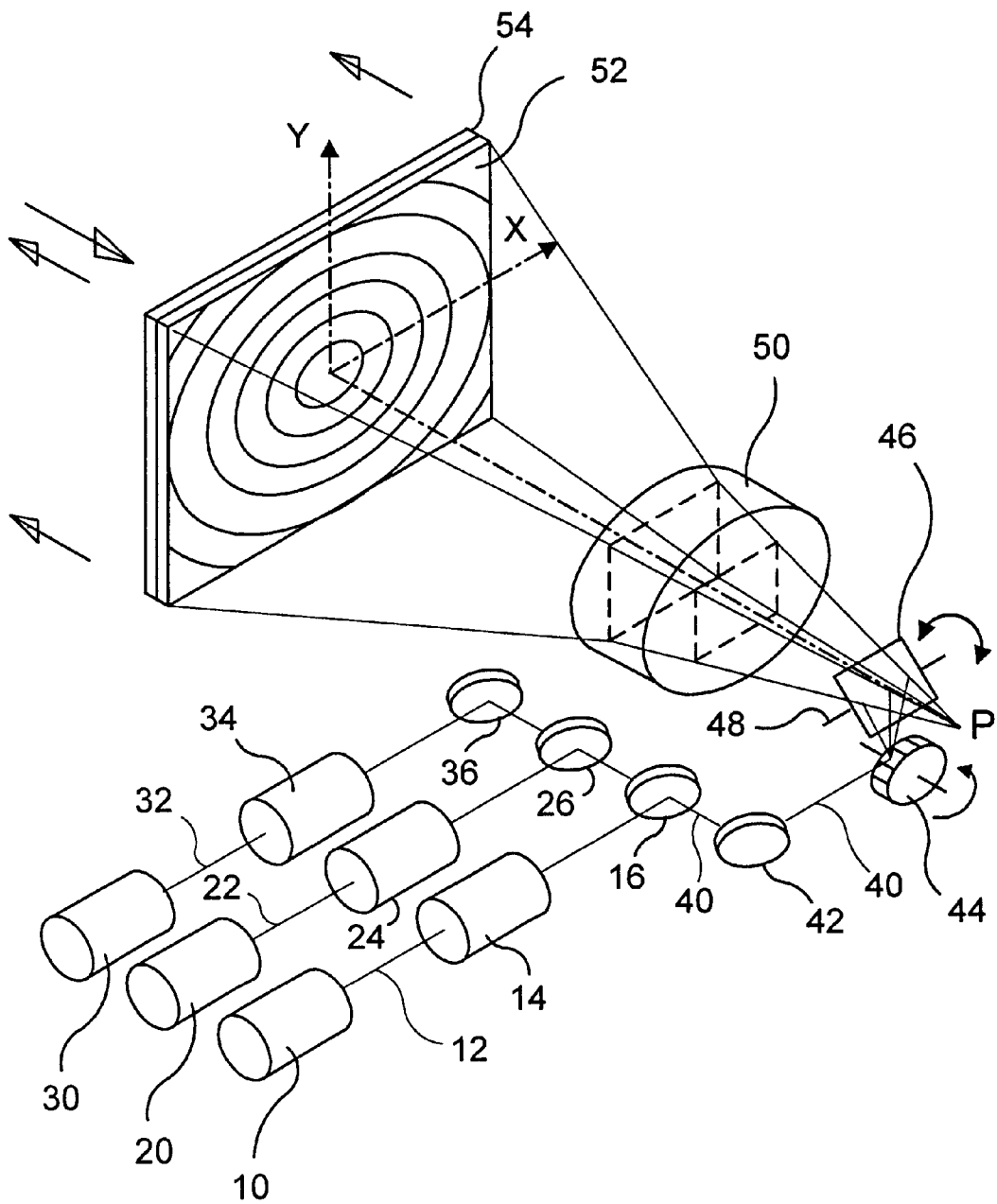
FIG. 1 shows a schematic view of a video system, according to the invention, with a lens system with variable focal length.

In the video system shown in FIG. 1, three light sources 10, 20, 30 generating substantially parallel light bundles 12, 22, 32 are used to control hue and brightness. Lasers are particularly suitable for this purpose. However, it is also conceivable to use other light sources such as LED's in which the light bundles are made parallel by means of an optical system. For this purpose, the optical system can have a lens, for example, the respective LED being arranged in its focal point. Diaphragms for beam limiting could also be provided in addition. The voltages to the LED's are changed to control the intensity of the light sources 10, 20, 30. For this purpose, it is particularly advantageous to use LED's which are as punctiform as possible.

In the example shown in FIG. 1, the light sources 10, 20, 30 are noble-gas lasers. Since their intensity cannot be changed quickly enough for a video picture, the light sources 10, 20 30 are operated at constant light output and the light intensity is changed by means of additional modulators 14, 24, 34. DKDP crystals, known from the prior art, are particularly suitable for this purpose.

The individual light bundles 12, 22, 32 are combined by means of dichroic mirrors 16, 26, 36 to form a common light bundle 40 which unifies all light bundles within the video system and passes through the video device in a single beam path.

A deflecting device by which the individual image points of the video picture can be formed sequentially is used for image generation. The common light bundle 40 by itself could now be deflected onto a screen 54 by the deflecting device. However, in order to achieve a particularly compact overall video system and to make full use of the available space in an advantageous manner, it is also possible to arrange various units of the projection systems at locations which cannot be optically connected linearly, wherein the light bundle 40 must then be deflected. Such a deflection is carried out in FIG. 1, by way of example, by means of a mirror 42 which directs the light bundle onto the deflecting device.

The deflecting device in the embodiment example shown in FIG. 1 has a polygon mirror 44 and a swivel mirror 46. The polygon mirror 44 is rotated continuously so that the light bundle 40 is deflected in a linewise manner by the series of polygon surfaces. The swivel mirror 46 is swiveled back and forth about an axis 48 and serves for framewise raster scanning. Electronic equipment known from the prior art is provided for swiveling and synchronization.

The light bundle 40 which is raster scanned in a framewise and linewise manner is guided through a lens system 50 whose operation will be discussed hereinafter. This lens system 50 changes the deflecting angle, and accordingly the image size, in a variable manner.

After exiting the lens system 50, the light bundle 40 is projected onto a Fresnel lens 52 and then onto the screen 54 on which it is visible to an observer in the direction indicated by the arrow as an image point of a video picture. However, for the purposes of the large projection devices mentioned in the introduction with sharply disparate requirements with respect to image size, the Fresnel lens 52 is generally omitted, since essentially only large distances between the screen 54 and the raster scanning device are to be taken into account and the sole function of the Fresnel lens consists in directing light bundles 40 with a very large angle relative to the screen 54 in a defined direction relative to the observer when the distance between the lens system 50 and the screen 54 is small.

The following figures substantially relate to the lens system 50. The optical axis of the lens system 50 is always designated by 61 in the following.

In the embodiment example shown in FIG. 2, a point 62 is drawn as a thick dot on the optical axis 61. This point 62 represents the entrance pupil of the optical system arranged downstream. As was already described with reference to FIG. 1, the deflecting device in video systems continually changes the angle of the light bundle 40 relative to the optical axis during raster scanning. The differently deflected light bundles 40 can be considered as substantially proceeding from one point. This point is determined by the position of the mirrors reflecting an incident light bundle over time at different angles.

However, this somewhat simplified version corresponds to reality only roughly. In the case of deflections via separate mirrors 46 and 44, this location is also shifted locally during the raster scanning of the image. Thus, the unique deflection location, as it will be considered hereinafter for the sake of simplicity and as represented by point 62, is to be replaced in practice by a spatially defined area for deflection. Accordingly, there are slight changes in dimensioning in the following examples. However, based on their expertise in the field, those skilled in the art can also transfer the insights gathered from this basic illustration to lens systems in which the spatial area for deflection is not unified only in a single point 62. Further, FIG. 4 shows an embodiment example in its full dimensions for these applications, which will further enable the person skilled in the art to transfer the characteristics of the invention described hereinafter to practical applications.

FIG. 2 further shows a lens 63 which deflects a light bundle 64 proceeding from point 62 at an angle. The object-side focal point of the lens 63 is located at the same point as point 62. Consequently, the light bundle 64 exits the lens 63 parallel to the optical axis 1.

Since the exiting light bundle 64 exits the optical system parallel to the optical axis 61, the image size in this example does not depend on the distance from the screen.

The dimensions of the image substantially depend on the focal length of the lens. This is clear from FIG. 2 in which a lens 63' with a short focal length is shown in dashed lines. It is arranged in such a way that its object-side focal point lies in point 62.

Because of the closer proximity of the lens 63' compared with lens 63, the light bundle 64', represented by a dashed line, exits closer to the optical axis 1. The image is accordingly smaller. The light bundles 64 and 64' have the same characteristics, each of them passing parallel to the optical axis.

The dimensions of the images can be changed by moving different lenses 63, 63' into the beam path of the light bundle 64 by means of a turret. However, for the position of the lenses in the turret it must be ensured for the purpose of maintaining the same imaging condition that the object-side focal point is always located at the same point so that the directions of the exiting light bundles remain unchanged regardless of the adjusted magnification.

Instead of providing a plurality of lenses in a turret, a variable-focus optical system, i.e., a lens system enabling the simulation of lenses 63 with a continuously adjustable focal length, can also be used. However, when adjusting the focal length it is advisable to ensure that the object-side focal point is maintained stationary at point 62 so that the imaging condition is not impaired when adjusting the dimensions. Since variable-focus optical systems of this kind also have a very large spatial extension along the optical axis, the achievable magnification, which, as will be seen from FIG. 2, substantially depends on the distance of the lens 63 from point 62, is also restricted by these dimensions. This area can be changed by adding a field lens or field lens group between point 62 and the lens 63 with variable focal length. This field lens or field lens group reduces or lengthens the distance between point 62 and the lens 63. The construction of such variable-focus optical systems and field lenses is illustrated more fully with reference to the embodiment example shown in FIG. 4.

The image size in the example shown in FIG. 2 is substantially defined by the dimensions of the lens 63. However, for practical applications this cannot be considered as an absolute limiting, since the image generated by the optical system according to FIG. 2 can be further magnified before reaching a screen 54 by additional lens systems, e.g., with constant magnification.

The embodiment example in FIG. 3 shows another arrangement in which the achievable image size also depends on the distance from the screen 54. For this purpose, a lens 65 first images the light bundle 64 in an intermediate image plane 66. The object-side focal point of the lens 65 is again situated at point 62 for a sharp imaging of the light bundles passing through point 62, while the image-side focal plane of the lens 65 is advisably selected as the intermediate image plane 66 so that a sharp image is formed on the intermediate image plane 66.

However, with respect to the set of problems relating to deflection in two points for two spatial directions, the sharp imaging is not given in the same manner for both deflection directions. In this case, the object-side focal point of the lens 65 is located in the spatial area for deflection so that the sharpness of the image is identical in both deflection directions.

For practical application in video systems, it has been shown that the distance of point 68 from the image-side focal point of the lens 65 on the optical axis can be less than 10% of the focal length of the lens 65. Similar conditions also result when using lens systems instead of individual lenses 65 and 63 which are considered by way of example.

The other thick point 68 shown in FIG. 3 represents an intersection of the optical axis 61 with the intermediate image plane 66. In this embodiment example, the object-side focal point of the subsequent lens 63 or 63' is fixed at this point, i.e., the position of the lens 63 or 63' is selected as a function of its focal length.

The two light bundles 64 and 64' exiting from the lenses 63 and 63' with different focal lengths are also indicated again in FIG. 3. It will be seen that the angles of the exiting light bundles 64 and 64' are different depending on whether lens 63 or lens 63' is selected as the second lens. Thus, the image generated on a screen is variable in magnitude. In contrast to FIG. 2, however, the light bundles exiting from the lens system according to FIG. 3 do not run parallel to one another, but rather at an angle defined by the imaging characteristics of the lens system.

Based on the conditions described for the position of the focal points of the lenses 65 and 63 or 63', the example in FIG. 3 shows a substantially afocal optical system. However, this is not an exact classical afocal optical system since, as was already explained, the intermediate image plane 66 need not agree exactly with the image-side focal plane of the lens 65, but rather its position is determined in part substantially by the spatial extension of the spatial area for deflection.

The image size which is generated depends on the distance of the projection system from the screen. Based on the selection of the object-side focal point of the lens 63 or 63', a parallel light bundle passing through point 62 remains substantially parallel. It will be appreciated from this fact that a sharp image is generated at all distances from the screen. Special devices for readjusting the sharpness are therefore unnecessary.

In comparing FIGS. 2 and 3, it will be seen that the image in the embodiment example in FIG. 3 is magnified when the focal length of lens 63 is decreased, whereas it is reduced in the embodiment example according to FIG. 2. Therefore, the spatial limitations in an optical system according to FIG. 2 deliver different results. In the embodiment example according to FIG. 2, the smallest achievable image size is determined by mechanical boundary conditions, whereas in the embodiment example according to FIG. 3 the image size also depends substantially on the distance between the screen and the lens system. For this reason, the embodiment example according to FIG. 3 enables a larger area for the adjustment of the image size for this area of application.

As is shown by model calculations, the substantially afocal system according to FIG. 3 can also be corrected in an improved manner with respect to freedom from distortion and minimizing chromatic errors compared with the embodiment example according to FIG. 2. Further, it is noted based on geometric optical considerations that the light bundle 64 or 64' is focussed better and enables increased image sharpness with large images.

In the example according to FIG. 3, the adjustment of the focal length and position of the lens 63 relative to that of lens 63' can again be effected by means of lenses in a turret or by a variable-focus objective. The use of field lenses in such a variable-focus objective for magnification in order to adapt the area for attainable magnifications is described in the following in an embodiment example shown in FIG. 4.

In parts a, b, and c, FIG. 4 shows three different lens settings to illustrate the adjustment of the focal length and accordingly the image size. The lens system 50 shown in the drawing was used in the embodiment example shown in FIG. 1. It is designed for changes of the image size in the range of $1/\sqrt{3}$ to $\sqrt{3}$, which is generally sufficient for use in the area of large projection.

It will be appreciated from a comparison of FIGS. 4 and 3 with respect to the position of the intermediate image plane 66 that the function of the lens 65 in this example is simulated by a system stage 70 of the lens system 50. It will further be appreciated from the path of the two schematically shown light bundles 40, 40', wherein the latter passes along the optical axis, that this light bundle 40' is focussed on the intermediate image plane 66 by the system stage 70.

A field lens group 76 comprising two field lenses 72 and 74 is arranged downstream of the intermediate image plane 66. This field lens group 76 was included in order to optically situate the intermediate image plane 66 at a greater distance relative to the system stage 70 so that the image size adjustment is adapted to the desired area. Further, the use of the field lens group 72 and 74 enables a particularly compact construction. This has advantages not only with respect to the handling of the lens system 50, but the lens system can also be better adapted to the aforementioned approximation based on the lens equation.

The stage which is arranged downstream with reference to the beam path of the light bundles 40 and 40' is a partial lens system 78 with variable focal length. In this embodiment example, the partial lens system 78 has only two lens groups which are adjustable relative to one another: the variator 80, and the compensator 82. As will be seen from a comparison of the three parts a, b, c of FIG. 4, not only are the compensator 82 and variator 80 displaced relative to one another, but the entire partial lens system 78 is also displaced relative to the field lens group 76 when changing the magnification.

The radii, index of refraction N, distances between the surfaces, and the Abbe dispersion number v of the lens system 50 of the embodiment example in FIG. 4 which is derived from a mean index of refraction and the base dispersion are indicated in the accompanying Table I. The surface numbers in the table refer to reference numbers 91 to 116 in FIG. 4. When the refractive index is given as 1.0 and the Abbe coefficient v is not shown, this indicates an air gap.

The indicated values give a focal length of 48.89 mm for the first stage. The total focal length of the field lens group 76 with variator 80 and compensator 82 varies with the position of the variator 80 and compensator 82. Table II shows some values for various positions 1 to 5. Positions 1, 3 and 5 correspond to parts a, b, and c of FIG. 4.

The embodiment example according to FIG. 4 is a substantially afocal lens system. This means that the focal points of the first stage 70 and of the lens system comprising the field lens group 76, variator 80, and compensator 82 lie close to the intermediate image plane 66. The magnification in such lens systems is given by the ratio of the focal lengths. The focal length of the lens system comprising the field lens group 76, variator 80, and compensator 82 is indicated for the different positions in the accompanying Table II.

The position of the compensator 82 and variator 80 is changed by rotating in specially cut threads corresponding to the optical requirements. For this purpose, the thread for the adjustment of the variator $h_v$ for the embodiment example was selected in such a way that it depends on the rotational angle $\phi$ of the variator as given by the following equation:

$$h_v = 0.32692\phi; \quad (\phi = 0-260°).$$

The displacement of the compensator $h_k$ is automatically adjusted during the rotation in accordance with the following equation:

$$h_k = \frac{\frac{h_v^2}{r}}{1 + \left[1 - (1-k)\left(\frac{h_v^2}{r}\right)^2\right]^{1/2}} + c_2\left(\frac{h_v}{85}\right)^4 + c_3\left(\frac{h_v}{85}\right)^6 + c_4\left(\frac{h_v}{85}\right)^8 + c_5\left(\frac{h_v}{85}\right)^{10}$$

with constants $r = 26.44781$ ,
$k = 2.68835$ ,
$c2 = 20.5846$ ,
$c3 = -30.6030$ ,
$c4 = 22.0388$  and  $c5 = -6.2021$.

Based on the cut thread for $h_v$, and $h_k$, the image size is set with a single rotation of a suitable adjusting drive, e.g., in the form of a crank guide. All dimension values are given in millimeters.

The embodiment example shown in FIG. 4 was used in a video system according to FIG. 1. It was shown that a large number of variations are possible in the available area for professional use of large projection of video pictures. When using the lens system 50, it was also found that the video pictures generated with the video device according to FIG. 1 could be displayed without distortion or chromatic errors regardless of the image size.

While the foregoing description and drawings represent the present invention, it will be obvious to those skilled in the art that various changes may be made therein without departing from the true spirit and scope of the present invention.

TABLE I

| surface number | radius of curvature | between surfaces | D (mm) | N | ν |
|---|---|---|---|---|---|
| 91 | 101 | 91–92 | 4 | 1.7343 | 28.2 |
| 92 | 35 | 92–93 | 10 | 1.6225 | 63.2 |
| 93 | −94 | 93–94 | 0.5 | 1.0 | |
| 94 | 44 | 94–95 | 6 | 1.6225 | 63.2 |
| 95 | 162 | 95–96 | 0.5 | 1.0 | |
| 96 | 24 | 96–97 | 10 | 1.6225 | 63.2 |
| 97 | 55 | 97–98 | 3 | 1.5343 | 48.5 |
| 98 | 14 | 98–99 | 22 | 1.0 | |
| 99 | ∞ | 99–100 | 42 | 1.0 | |
| 100 | 44 | 100–101 | 5 | 1.5421 | 59.4 |
| 101 | −88 | 101–102 | 15 | 1.0 | |
| 102 | 62 | 102–103 | 2 | 1.5848 | 40.6 |
| 103 | 24 | 103–104 | variable | 1.0 | |
| 104 | 54 | 104–105 | 10 | 1.5187 | 64.0 |
| 105 | −20 | 105–106 | 2 | 1.7923 | 47.2 |
| 106 | −55 | 106–107 | 8 | 1.0 | |
| 107 | 87 | 107–108 | 2 | 1.5848 | 40.6 |
| 108 | 16 | 108–109 | 10 | 1.5544 | 63.2 |
| 109 | −40 | 109–110 | variable | 1.0 | |
| 110 | −200 | 110–111 | 8 | 1.7617 | 27.4 |
| 111 | −28 | 111–112 | 2 | 1.5187 | 64.0 |
| 112 | 18 | 112–113 | 15 | 1.0 | |
| 113 | −17 | 113–114 | 3 | 1.7923 | 47.2 |
| 114 | −37 | 114–115 | 0.5 | 1.0 | |
| 115 | 137 | 115–116 | 5 | 1.6539 | 55.6 |
| 116 | −80 | | | | |

TABLE II

| position number | D (mm) between surfaces 103, 104 | D (mm) between surfaces 109, 110 | focal length (mm) surfaces 100–116 |
|---|---|---|---|
| 1 | 96.7 | 5.9 | 84.9 |
| 2 | 65.4 | 10.2 | 63.5 |
| 3 | 43.0 | 15.6 | 48.2 |
| 4 | 24.8 | 23.4 | 35.8 |
| 5 | 12.2 | 33.0 | 27.2 |

What is claimed is:

1. In a process for imaging image points of a video picture by means of a light bundle which is controlled in intensity with respect to the brightness of the image points and which is deflected and then projected on a screen by a lens or a lens system, the improvement comprising the steps of:

providing a variable focal length for the lens; and maintaining an object-side focal point stationary when the focal length is varied.

2. The process according to claim 1, wherein the object-side focal point which is kept stationary is maintained within a spatially extended area in which the deflection is effected.

3. The process according to claim 1, wherein the object-side focal point is maintained stationary in that the position of the lens is changed when the focal length changes.

4. In an apparatus for imaging image points of a video picture on a screen having a deflecting device which deflects a light bundle onto a screen for linewise and framewise raster-scanning, wherein the light bundle is controlled in intensity with respect to the brightness of the image points, and having a lens or a lens system between the deflecting device and the screen, the improvement comprising:

that the lens, the lens system or a partial lens system of the lens system can be adjusted with respect to an object-side focal point, and a device is provided which maintains stationary the object-side focal point of the lens, the lens system or the partial lens system during adjustment of a focal length.

5. The apparatus according to claim 4, wherein the lens system is used, and the device fixes the object-side focal point within an area of the deflecting device or in a plane in the optical path of the lens system in which the light bundle can be focussed.

6. The apparatus according to claim 4, wherein the lens, the lens system or the partial lens system of the lens system has a continuously adjustable focal length.

7. The apparatus according to claim 4, wherein the lens system is used, said lens system being a substantially afocal lens system.

8. The apparatus according to claim 4, wherein the lens system is used, said lens system comprising multiple stages and a first stage is arranged at a constant distance to the deflecting device, wherein at least one of the other stages has a variable focal length and is arranged so as to be displaceable relative to the first stage.

9. The apparatus according to claim 8, wherein the lens system is so designed that the video picture can be imaged in an intermediate image plane upstream of the lens system with variable focal length and the lens system with variable focal length is displaceable by means of the device in such a way that its object-side focal point substantially lies on an optical axis of the lens system in the vicinity of or within the intermediate image plane.

10. The apparatus according to claim 9, wherein a field lens or field lens group is arranged between the intermediate image plane and the lens system with variable focal length.

11. The apparatus according to claim 4, wherein the lens system is used, said lens system being a multiple-stage afocal lens system and a last stage of the multiple-stage afocal lens system being constructed as a lens or as a partial lens system with variable focal length.

12. The apparatus according to claim 4, wherein the lens system is used, and the lens system with variable focal-length has two system stages which are displaceable relative to one another and by which the focal length can be adjusted, and a movement mechanism is provided which is so designed that the object-side focal point remains stationary as the focal length changes.

13. The apparatus according to claim 12, wherein the movement of one system stage relative to the other system stage is effected by means of a mechanical cam control.

14. The apparatus according to claim 4, wherein the lens system is used, the lens system being corrected for chromatic errors and distortion.

15. In a process for imaging image points of a video picture by means of a light bundle which is controlled in intensity with respect to the brightness of the image points and which is deflected and then projected on a screen by a lens or a lens system, the improvement comprising the steps of:

providing a variable focal length for the lens system; and maintaining an object-side focal point stationary when the focal length is varied.

16. The process according to claim 15, wherein the object-side focal point which is kept stationary is maintained within a spatially extended area in which the deflection is effected.

17. The process according to claim 15, wherein the object-side focal point is maintained stationary in that the position of the lens system is changed when the focal length changes.

18. In a process for imaging image points of a video picture by means of a light bundle which is controlled in intensity with respect to the brightness of the image points and which is deflected and then projected on a screen by a lens or a partial lens system of a lens system, the improvement comprising the steps of:

providing a variable focal length for the partial lens system of the lens system; and maintaining an object-side focal point stationary when the focal length is varied.

19. The process according to claim 18, wherein the object-side focal point which is kept stationary is maintained within a spatially extended area in which the deflection is effected.

20. The process according to claim 18, wherein the object-side focal point is maintained stationary in that the position of the partial lens system is changed when the focal length changes.

* * * * *